United States Patent [19]

Taguchi

[11] Patent Number: 5,326,046
[45] Date of Patent: Jul. 5, 1994

[54] TAPE CASSETTE WITH REEL LOCKING MEMBER SUPPORTED FOR SLIDING MOVEMENT BY CONVERGING RIBS

[75] Inventor: Osamu Taguchi, Miyagi, Japan
[73] Assignee: Sony Corporation, Tokyo, Japan
[21] Appl. No.: 956,957
[22] Filed: Oct. 6, 1992
[30] Foreign Application Priority Data Oct. 25, 1991 [JP] Japan ................... 3-305580

[51] Int. Cl.$^5$ .......................................... G11B 23/087
[52] U.S. Cl. .................................................. 242/343.2
[58] Field of Search .................. 242/198, 199; 360/132

[56] References Cited

U.S. PATENT DOCUMENTS 3,259,331  7/1966  Liddle ........................ 242/198
4,743,992  5/1988  Komiyama et al. .......... 242/198

Primary Examiner—Daniel P. Stodola
Assistant Examiner—John Q. Nguyen
Attorney, Agent, or Firm—Lewis H. Eslinger; Jay H. Maioli

[57] ABSTRACT

A tape cassette includes a case body consisting of an upper half case and a lower half case, a pair of hubs contained in the case body and holding a magnetic tape thereon, and a locking member placed in a recess formed in the inner surface of the lower half case so as to be brought into engagement with the respective circumferences of the hubs to lock the hubs and to be disengaged from the respective circumferences of the hubs to unlock the hubs. The locking member having a tail portion having a surface consisting of convex, curved working surfaces, and the unlocking pin of a recording/reproducing apparatus engaging either of the convex, curved working surfaces to shift the locking member to the unlocked position when the tape cassette is inserted in the recording/reproducing apparatus. Ribs formed on the bottom surface of the recess to support the locking member for smooth sliding movement thereon and the ribs including two ribs formed at a position corresponding to the tail portion of the locking member and inclined in opposite directions at an angle to the direction of sliding movement of the locking member, substantially conforming to the shape of the tail portion.

4 Claims, 11 Drawing Sheets

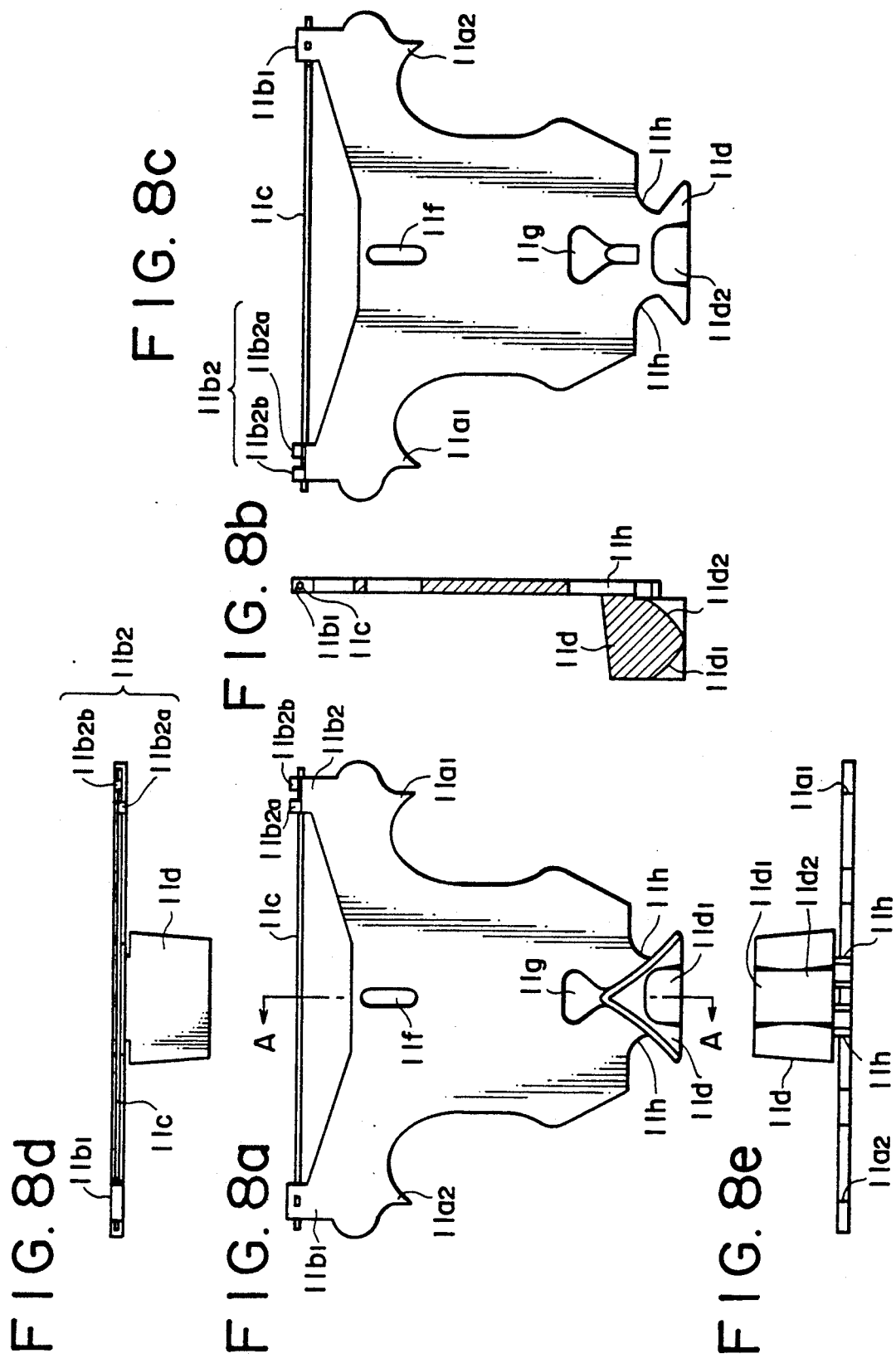

TAPE CASSETTE WITH REEL LOCKING MEMBER SUPPORTED FOR SLIDING MOVEMENT BY CONVERGING RIBS

BACKGROUND OF THE INVENTION

1. Field of the Invention

The present invention relates to a tape cassette provided with a locking member for locking hubs contained therein while the tape cassette is not in use.

2. Description of the Prior Art

Some practical tape cassettes holding a tape for the high-density recording of video signals or PCM signals, such as ½ in. video tape cassettes and 8 mm video tape cassettes, are provided with a locking member for locking hubs contained therein while the tape cassettes are not in use and kept for storage. Such a locking member is pressed by the resilience of a spring against the hubs to lock the hubs when the tape cassette is not in use. The locking member is separated from the hubs by an unlocking pin to unlock the hubs when the tape cassette is inserted in a tape drive. Such tape cassettes provided with a locking member are disclosed, for example, in U.S. patent application Ser. Nos. 622,649 filed Dec. 5, 1990, 802,405 filed Dec. 4, 1991 and 827,933 filed Jan. 29, 1992.

FIGS. 1a and 1b are a schematic plan view and a schematic side view, respectively, of a prior art tape cassette in an inoperative state, and FIGS. 2a and 2b are a schematic plan view and a schematic side view, respectively, of the same prior art tape cassette in an operating state, in which indicated at 61 is a locking member, at 62 are hubs, at 63 indicated by alternate long and short dash lines is the case body 63 of the tape cassette and at T is a tape held on the hubs 62.

The locking member 61 is provided with locking protrusions 61a which engage teeth 62a formed in the circumferences of the hubs 62 to lock the hubs 62 and has the shape of a substantially T-shaped flat plate. A locking spring 61c, such as a stainless steel spring wire, has opposite ends connected to knuckles $61b_1$ and $61b_2$, and a middle portion engaging a peg 64 formed on the inner surface of the case body 63. Normally, namely, when the tape cassette is not in use, the locking member is biased toward the hubs 62 by the locking spring 61c so that the locking protrusions 61a engage the teeth 62a to lock the hubs 62 as best shown in FIG. 1a.

When the tape cassette is inserted in a recording/reproducing apparatus, an unlocking pin 65 enters the tape cassette through an opening 63a formed in the case body 63 and engages the edge 61d of the locking member 61 provided with flat slopes $61d_1$ and $61d_2$ at a position corresponding to the opening 63a to push the locking member 61 up against the resilience of the locking spring 61c as shown in FIG. 2b, so that the locking protrusions 61a are disengaged from the teeth 62a to unlock the hubs 62 as shown in FIG. 2a. The locking member 61 is provided with a slot 61f and a guide pin 66 formed on the inner surface of the case body 63 is fitted in the slot 61f to guide the locking member 61 for sliding movement between a locked position shown in FIG. 1a and an unlocked position shown in FIG. 2a.

When pushed by the unlocking pin 65, the locking member 61 slides in a space between the hubs 62 along the inner surface of one of the halves of the case body 63. Since the locking member 61 has the shape of a flat plate and is in close contact with the inner surface of the half of the case body 63, it occurs, in some cases, that the locking member 61 is unable to slide smoothly. It is possible to avoid plane contact between the locking member 61 and the inner surface of the half case of the case body 63 to ensure the smooth sliding movement of the locking member 61 by forming ribs parallel to the direction of movement of the locking member 61 on the inner surface of the half of the case body 63 and making the locking member 61 slide along the ribs. However, the locking member 61 is liable to be supported on the ribs within the case body 63 of the tape cassette in an unstable position and unable to lock the hubs 62 properly.

In such a prior art hub locking arrangement, the unlocking pin 65 slides along the flat slope $61d_1$ ($61d_2$) to push the locking member 61 against the resilience of the locking spring 61c and a considerably large force is exerted on the point of contact between the flat slope $61d_1$ ($61d_2$) and the extremity of the unlocking pin 65, which hinders the entrance of the unlocking pin into the tape cassette and abrades the flat slope $61d_1$ ($61d_2$).

SUMMARY OF THE INVENTION

Accordingly, it is an object of the present invention to provide a tape cassette provided with a locking member for locking hubs contained therein, capable of being smoothly moved between a locked position and an unlocked position.

In one aspect of the present invention, a tape cassette comprises a case body consisting of a first half case and a second half case, a pair of hubs holding a magnetic tape thereon and contained in the case body, and a locking member capable of being brought into engagement with the circumferences of the hubs to lock the hubs and of being disengaged from the hubs to release the hubs, wherein one of the first and second half cases receiving the locking member is provided on its inner surface with ribs extending at an angle to the direction of sliding movement of the locking member in conformity with the shape of the sliding surface of the locking member.

The ribs extending at an angle to the direction of sliding movement of the locking member in conformity with the shape of the sliding surface of the locking member and formed on the inner surface of the half case enable the locking member to slide smoothly on the ribs in line-contact with the ribs and stabilize the position of the locking member.

In another aspect of the present invention, a tape cassette comprises a case body consisting of a first half case and a second half case, a pair of hubs holding a magnetic tape thereon and contained in the case body, a locking member capable of being brought into engagement with the circumferences of the hubs and of being disengaged from the circumferences of the hubs, and a locking spring biasing the locking member toward the hubs so as to make the locking member engage the circumferences of the hubs, wherein the locking member has a tail portion having a surface consisting of convex, curved working surfaces of varying curvature, and the unlocking pin of a recording/reproducing apparatus engages either of the convex, curved working surfaces to move the locking member toward an unlocked position when the tape cassette is inserted in the recording/reproducing apparatus.

Since the unlocking pin engages the convex, curved working surface of varying curvature of the locking member, the locking member can be moved toward the unlocked position by a relatively small force exerted on the convex, curved working surface by the unlocking pin.

BRIEF DESCRIPTION OF THE DRAWINGS

The above and other objects, features and advantages of the present invention will become more apparent from the following description taken in connection with the accompanying drawings, in which:

FIGS. 8a, 8b, 8c, 8d and 8e are a top plan view, a sectional view taken on line A—A in FIG. 8a, a rear view, a side view and another side view, respectively, of a locking member included in the tape cassette of FIG. 4;

DETAILED DESCRIPTION OF THE PREFERRED EMBODIMENTS

A tape cassette in a preferred embodiment according to the present invention will be described hereinafter with reference to FIGS. 3 to 9. The tape cassette in this embodiment is a subminiature tape cassette of about 20 mm in width and about 30 mm in length.

Figure 4:
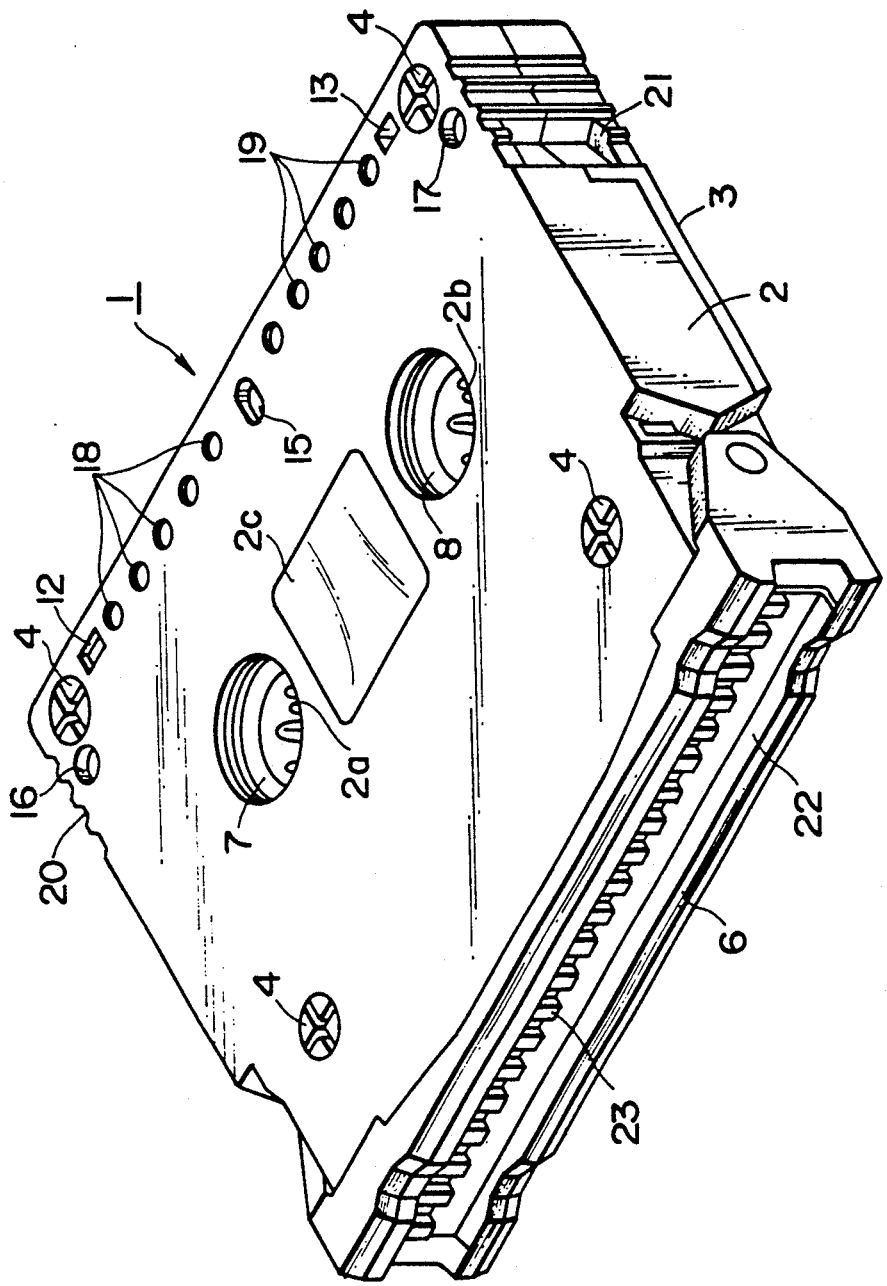
FIG. 4 is a perspective view of the tape cassette in the preferred embodiment according to the present invention.
Figure 5:
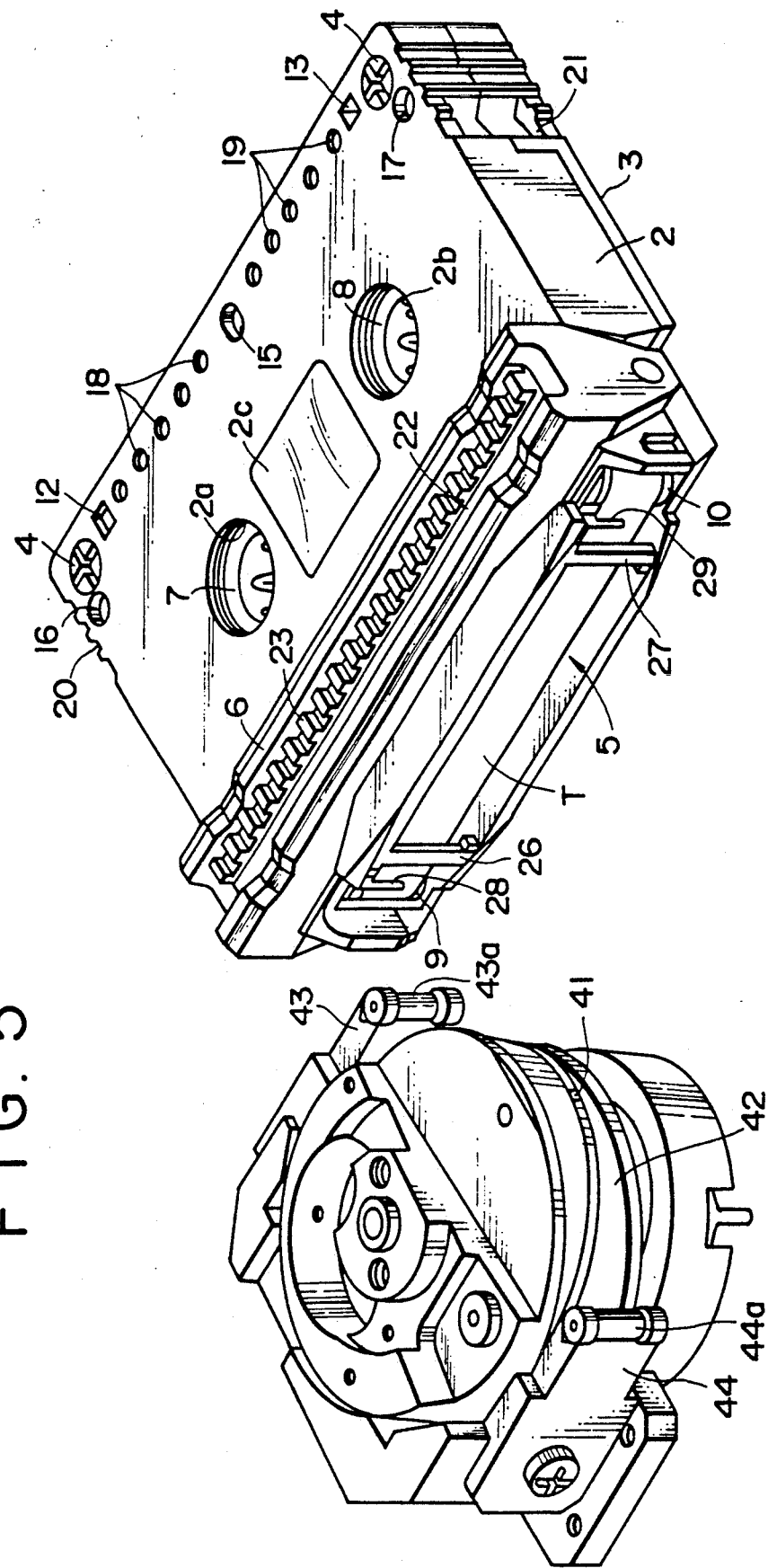
FIG. 5 is a perspective view of perspective view of assistance in explaining the relation between the tape cassette of FIG. 4 and a magnetic head drum.
Figure 6:
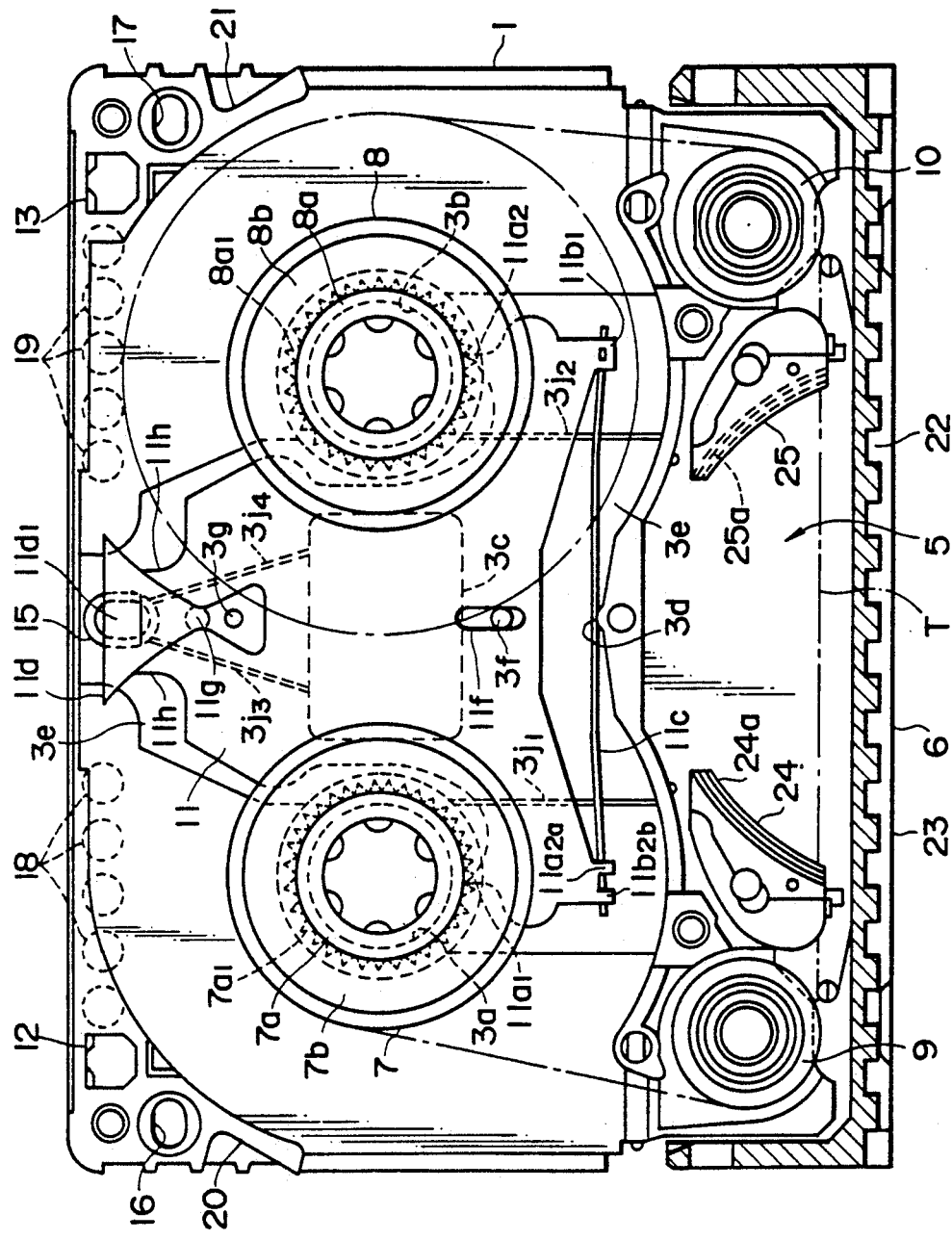
FIG. 6 is a plan view of the tape cassette of FIG. 4, in which a second half case is removed.
Figure 7:
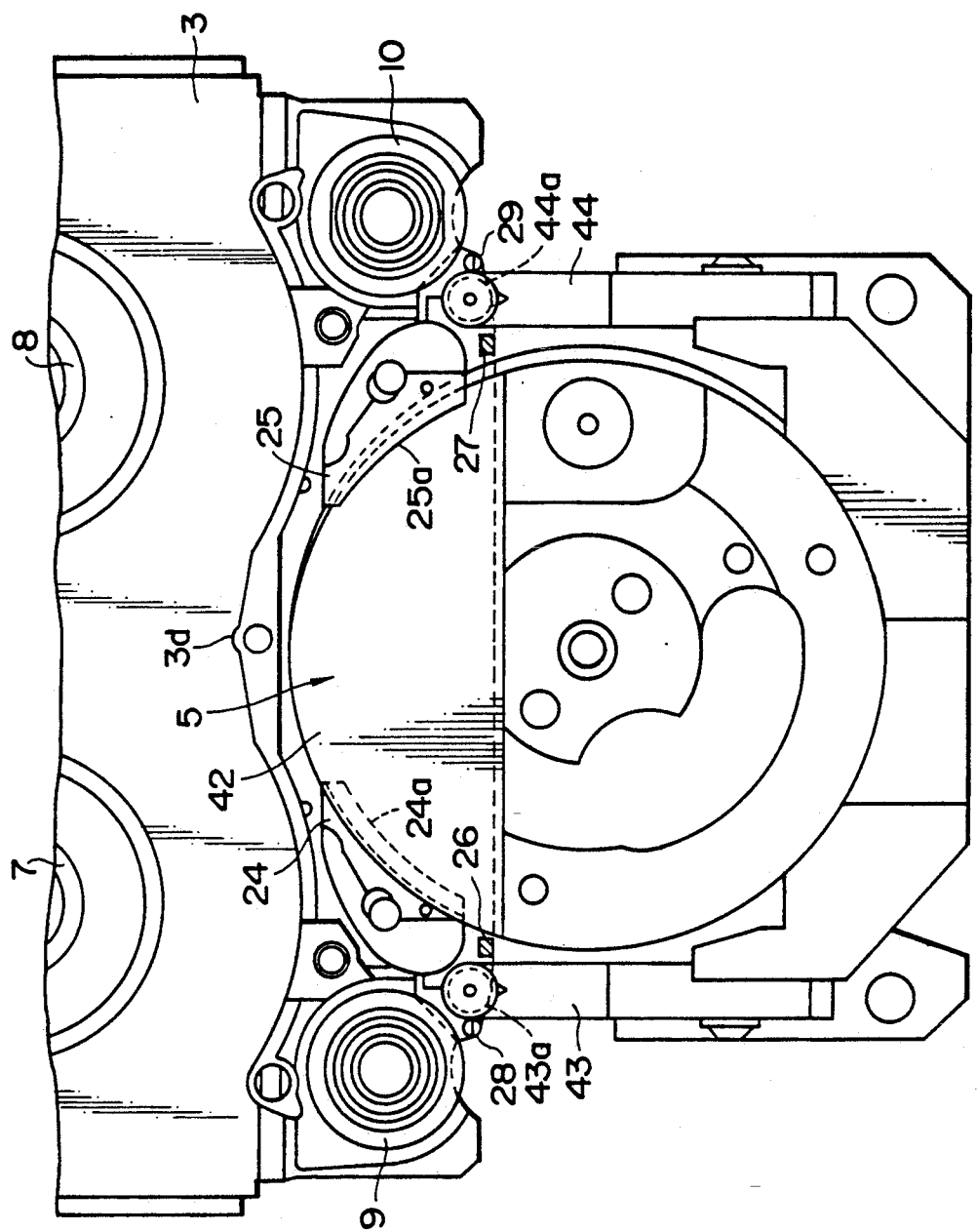
FIG. 7 is a plan view of assistance in explaining the positional relationship between the tape cassette of FIG. 4 and the magnetic head drum of FIG. 5.

Referring to FIGS. 4 to 9, a tape cassette 1 holding a magnetic tape for recording, for example, PCM signals thereon and for reproducing, for example, PCM signals recorded thereon has a case body formed by fastening together an upper half case 2 and a lower half case 3 with screws 4, and provided with a lid 6 covering a front opening 5 formed in the front side of the case body. As shown in FIGS. 4, 5 and 6, a pair of hubs 7 and 8 are contained in the case body of the tape cassette 1 at positions corresponding to openings 2a and 2b formed in the upper half case 2 and openings 3a and 3b formed in the lower half case 3, respectively, and a magnetic tape T is held on the hubs 7 and 8 so as to pass from one of the hubs 7 and 8 to the other and vice verse. A portion of the magnetic T extending between pinch rollers 9 and 10, which serve also as guide rollers, supported for rotation at the opposite ends of the front opening 5 is accessible from outside.

Erase inhibit mechanisms 12 and 13 are formed across the upper half case 2 and the lower half case 3 in the upper and lower walls of the case body of the tape cassette 1 at positions near the opposite corners on the side of the rear wall of the case body, respectively. Positioning holes 15, 16 and 17 are formed in the case body at the middle and near the opposite corners, respectively, on the side of the rear wall of the case body. A plurality of holes 18 and 19 for detection are formed in the case body along the rear wall of the case body. Gripping recesses 20 and 21 are formed in the side walls of the case body at positions near the rear end of the case body.

As best shown in FIGS. 4 and 5, the lid 6 for covering the front opening 5 of the case body is provided with a rack 23 formed in a lateral groove 22 formed in its front wall. When the tape cassette 1 is inserted in a cassette magazine, a cassette changer engages the rack 23 in ejecting the tape cassette 1 from the cassette magazine. Windows 2c and 3c of a transparent resin are formed in the central portion of the top wall of the upper half case 2 and the central portion of the bottom wall of the lower half case 3, respectively, to enable the recognition of the quantity of the magnetic tape T on the hubs 2 and 3.

When the tape cassette 1 is loaded on a recording/reproducing apparatus, the recording/reproducing apparatus records signals on the magnetic tape T and reproduces signals recorded on the magnetic tape T by a helical scanning method with a rotary head.

Referring to FIG. 5, a rotary head 41 revolves along a circle inclined at a predetermined angle to a head cylinder 42. A portion of the head cylinder 42 is received in the tape cassette 1 through the front opening 5 opened by turning up or down the lid 6 of the tape cassette 1. The rotary head 41 records signals on inclined tracks extending obliquely across the magnetic tape T while the magnetic tape T slides along the surface of the portion of the head cylinder 42 received in the tape cassette 1. As shown in FIG. 6, in which the upper half case 2 is removed, a pair of tape guide members 24 and 25 having guide surfaces 24a and 25a inclined in opposite directions, respectively, are disposed on the inner sides of the pinch rollers 9 and 10, respectively, to guide the magnetic tape T so as to slide helically along the circumference of the head cylinder 42. Accordingly, the respective guide surfaces 24a and 25a of the tape guide members 24 and 25 extend close to and along the circumference of the head cylinder 42 to guide the magnetic tape T along the circumference of the head cylinder 42.

The rotary magnetic head is provided with wing guides 43 and 44 respectively having rollers 43a and 44a at their front ends. The wing guides 43 and 44 are disposed on the opposite sides of the head cylinder 42. When the tape cassette 1 is inserted in the recording/reproducing apparatus, the wing guides 43 and 44 are disposed between the pinch roller 9 and the tape guide member 24 and between the pinch roller 10 and the tape guide member 25, respectively, to press the magnetic tape T against the tape guide members 24 and 25. The wing guides 43 and 44 are disposed between a support member 26 and a tape guide 28 formed between the support member 26 and the pinch roller 9, and between a support member 27 and a tape guide 29 formed between the support member 27 and the pinch roller 10, respectively.

Referring to FIG. 6 showing the internal arrangement of the tape cassette 1, the hubs 7 and 8 consist of inner hubs $7a$ and $8a$ in which hub driving shafts are inserted and outer hubs $7b$ and $8b$ put on the inner hubs $7a$ and $8a$ so as to be axially movable relative to the inner hubs $7a$ and $8a$ and restrained from turning relative to the inner hubs $7a$ and $8a$, respectively. Locking teeth $7a_1$ and $8a_1$ are formed in the respective circumferences of at least portions of the inner hubs $7a$ and $8a$ projecting from the outer hubs $7b$ and $8b$ toward the lower half case 3, respectively. A locking member 11 is placed in a recess $3e$ formed in the inner surface of the lower half case 3. The locking member 11 engages the teeth $7a_1$ and $8a_1$ of the hubs 7 and 8 to lock the hubs 7 and 8 when the tape cassette 1 is not in use.

Referring to FIGS. $8a$ to $8e$, the locking member 11 has locking protrusions $11a_1$ and $11a_2$ to be brought into engagement with the teeth $7a_1$ and $8a_1$ of the hubs 7 and 8, knuckles $11b_1$ and $11b_2$, a locking spring $11c$, such as a stainless steel spring wire, held on the knuckles $11b_1$ and $11b_2$, a tail portion $11d$ having convex, curved working surfaces $11d_1$ and $11d_2$, a slot $11f$ and a substantially triangular opening $11g$. The locking member 11 is formed of an engineering plastic, such as POM.

Normally, i.e., when not in use, the locking member 11 is biased toward a locked position by the locking spring $11c$ strained by a pressing nose $3d$ formed within the cassette 1 as shown in FIG. 6 and the locking protrusions $11a_1$ and $11a_2$ are in engagement with the teeth $7a_1$ and $8a_1$ of the inner hubs $7a$ and $8a$, respectively, as shown in FIG. 9 $(a)$ to lock the hubs 7 and 8.

The locking member 11 is formed by insert molding, in which the locking spring $11c$ is fastened firmly to the knuckle $11b_1$ at its one end so that the locking spring $11c$ may not come off the locking plate 11. The locking spring $11c$ is held loose at the other end between the two lugs $11b_{2a}$ and $11b_{2b}$ of the knuckle $11b_2$. The combination of the locking member 11 and the locking spring $11c$ by insert molding eliminates a process of assembling the locking member 11 and the locking spring $11c$, facilitates the tape cassette assembling work and reduces the cost of the tape cassette 1.

When the tape cassette 1 is inserted in the recording/reproducing apparatus, a positioning pin 99 provided in the recording/reproducing apparatus enters the tape cassette 1 through the positioning hole 15 of the upper half case 2 or the lower half case 3 as shown in FIG. $9b$ to position the tape cassette 1 correctly in the recording/reproducing apparatus. The positioning pin 99 serves also as an unlocking pin. The positioning pin 99 comes into contact with the convex curved working surface $11d_1$ ($11d_2$) of the tail portion $11d$ to shift the locking member 11 toward the front side of the tape cassette 1. The movement of the tape cassette 1 is guided by guide pins $3f$ and $3g$ inserted respectively in the slot $11f$ and the opening $11g$ of the locking member 11 and, consequently, the locking protrusions $11a_1$ and $11a_2$ of the locking member 11 are disengaged from the teeth $7a_1$ and $8a_1$ as shown in FIG. $9b$ to enable the hubs 7 and 8 to rotate. Since the guide pin $3g$ is inserted in the substantially triangular opening $11g$ and does not determine the lateral position of the locking member 11, the locking member 11 is able to turn on the guide pin $3f$.

When the tape cassette 1 is ejected from the recording/reproducing apparatus, the positioning pin 99 comes out of the positioning hole 15, the locking member 1 is shifted from the unlocked position (FIG. $9b$) to the locked position (FIG. $9a$) by the resilience of the locking spring $11c$ to lock the hubs 7 and 8. As shown in FIGS. $9a$ and $9b$, the inner hub $8a$ ($7a$) is provided with teeth $8a_1$ ($7a_1$) also in the circumference of a portion projecting from the outer hub $8b$ ($7b$) toward the upper half case 2. Thus, the hubs 7 and 8 can be disposed in the case body indifferently to their orientation when assembling the tape cassette 1, which facilitates work for assembling the tape cassette 1.

Although the locking member 11 obstructs the window $3c$ of the lower half case 3, the quantity of the magnetic tape held on the hubs 7 and 8 can be seen through the window $3c$ and the locking member 11 because the locking member 11 is formed of a transparent resin by molding. The locking member 11 may be provided with an opening that enables the observation of the magnetic tape T held on the hubs 7 and 8 therethrough regardless of the position of the locking member 11. Transparent friction sheets, not shown, are interposed between the inner surface of the upper half case 2 and the upper ends of the hubs 7 and 8 and between the inner surface of the lower half case 3 and the lower ends of the hubs 7 and 8 to secure the smooth rotation of the hubs 7 and 8, to prevent the entanglement of the magnetic tape T and to prevent the lost motion of the hubs 7 and 8. Thus, the hubs 7 and 8 are restrained from unnecessary rotation by the locking member 11 when the tape cassette is not in use.

Figure 1A:
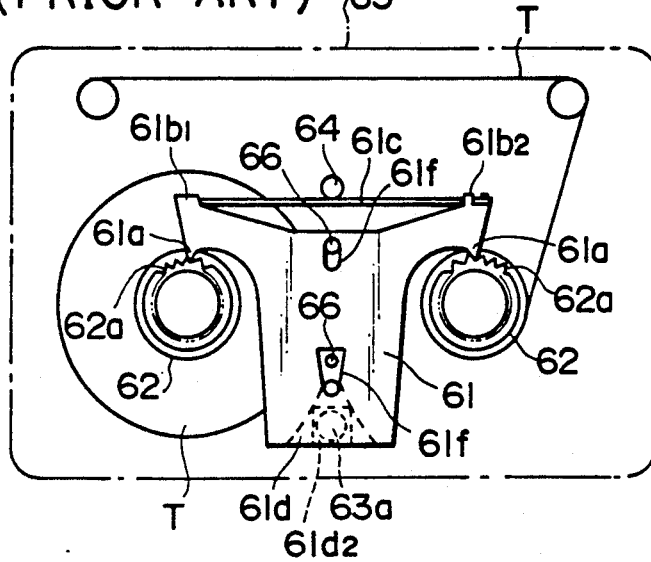
FIGS. 1a and 1b are a schematic plan view and a schematic side view, respectively, of a prior art tape cassette, in which a locked member is at a locking position.
Figure 1B:
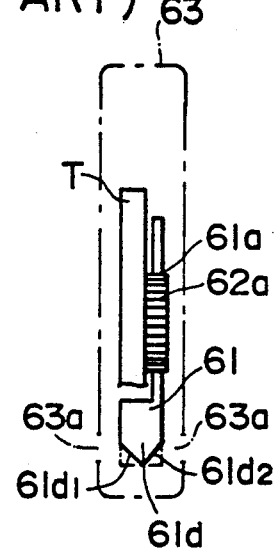
Figure 2A:
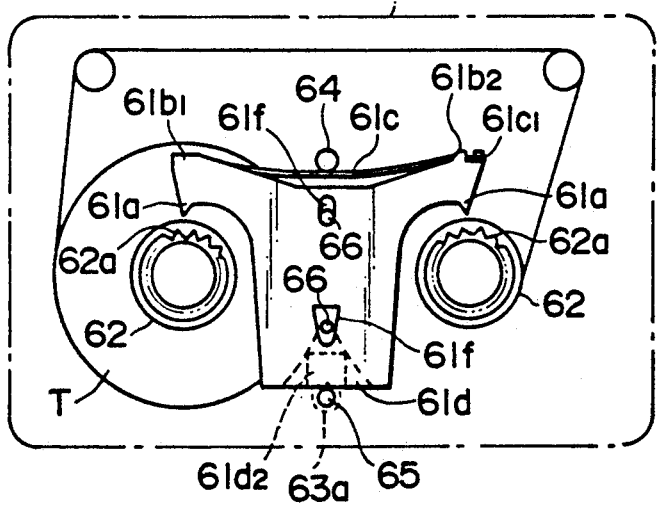
FIGS. 2a and 2b are a schematic plan view and a schematic side view of the tape cassette of FIGS. 1a and 1b, in which the locking member is at an unlocked position.
Figure 2B:
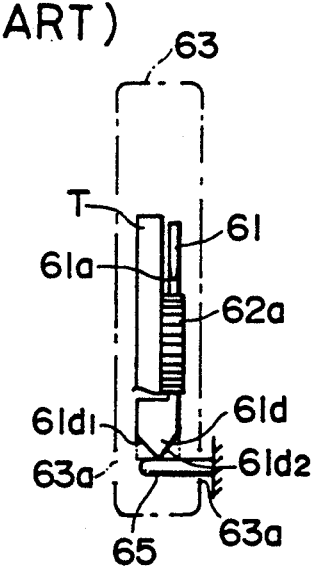
Figure 3:
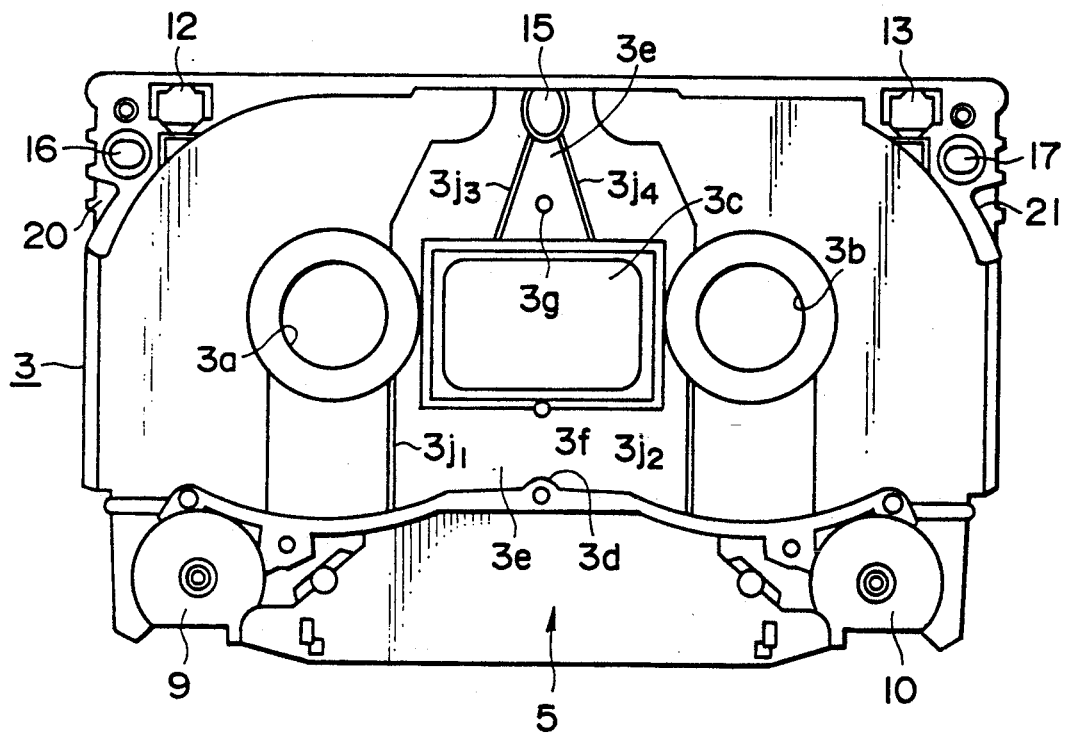
FIG. 3 is a plan view of a lower half case of a tape cassette in a preferred embodiment according to the present invention.

As shown in FIGS. 3 and 6, ribs $3j$ ($3j_1$ to $3j_4$) of a height on the order of 0.03 mm are formed on the bottom surface of the recess $3e$ receiving the locking member 11 therein and the locking member 11 is supported in line contact on the ribs $3j_1$ to $3j_4$ for sliding movement. Thus, the locking member 11 is able to slide smoothly on the ribs $3j_1$ to $3j_4$. The ribs $3j_1$ and $3j_2$ nearer to the front side of the case body are extended in parallel to the direction of sliding movement of the locking member 11. The ribs $3j_3$ and $3j_4$ nearer to the rear side of the case body are inclined in opposite directions, respectively, at an angle to the direction of sliding movement of the locking member 11, substantially conforming to the shape of the sliding surface of the locking member 11. Thus, the locking member 11 is securely supported in a horizontal position on the ribs $3j_1$ to $3j_4$ for reliable locking.

Although the locking member 11 is able to turn in a horizontal plane, the ribs $3j_3$ and $3j_4$ will not interfere with the edges of the tail portion $11d$ of the locking member 11 to obstruct the locking operation of the locking member 11, because the ribs $3j_3$ and $3j_4$ converge toward the positioning hole 15. The number, length and direction of extension of the ribs $3j$ are not limited to those specifically described herein and may be changed according to the shape of the locking member 11.

The present invention is not limited in its application to the subminiature tape cassette described herein; the present invention is applicable also to various tape cassettes provided with a locking member for locking the hubs.

Figure 10:
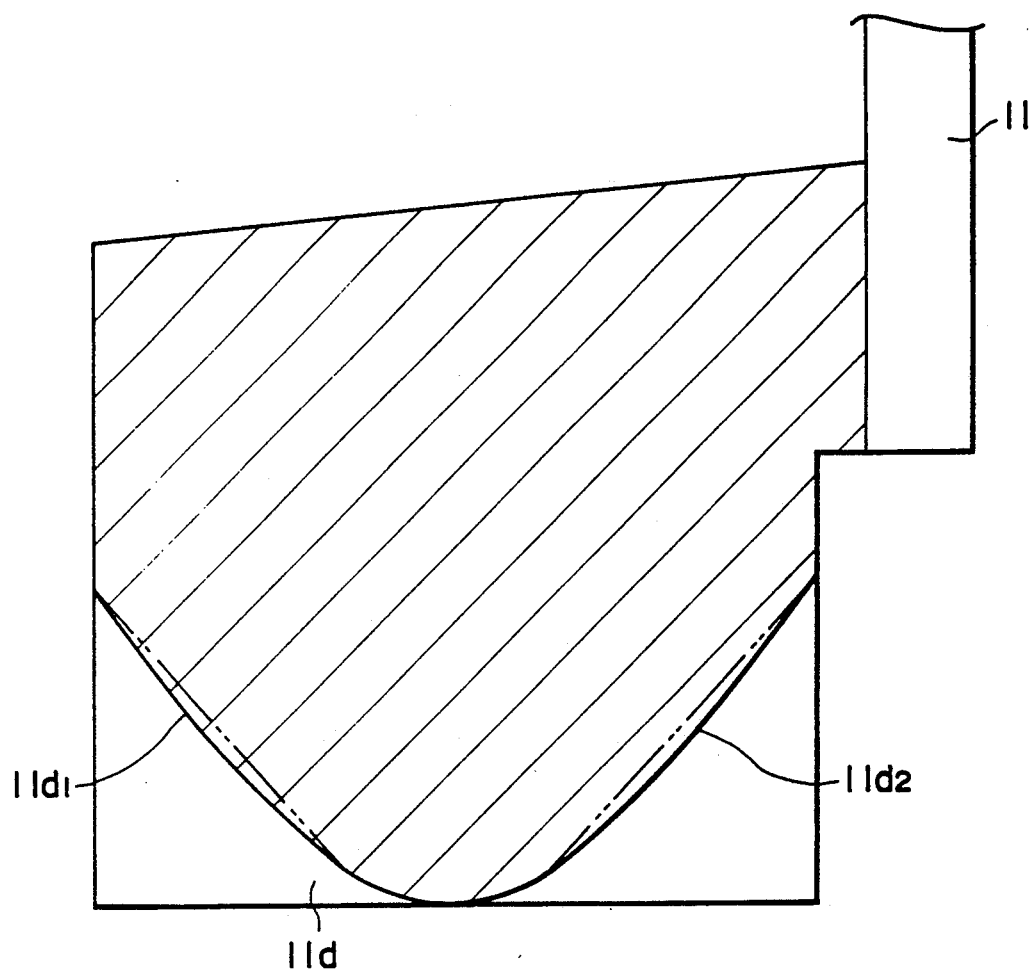
FIG. 10 is an enlarged, sectional view of the tail portion of the locking member of FIGS. 8a to 8e, having a surface consisting of convex, curved working surfaces.

FIG. 10 is an enlarged, fragmentary sectional view of the tail portion $11d$ of the locking member 11, having a surface consisting of convex, curved working surfaces $11d_1$ and $11d_2$ of varying curvature. In FIG. 10, indicated by alternate long and two short dashes lines is the contour of the working surfaces of the tail portion of a locking member employed in a prior art tape cassette.

Figure 9A:
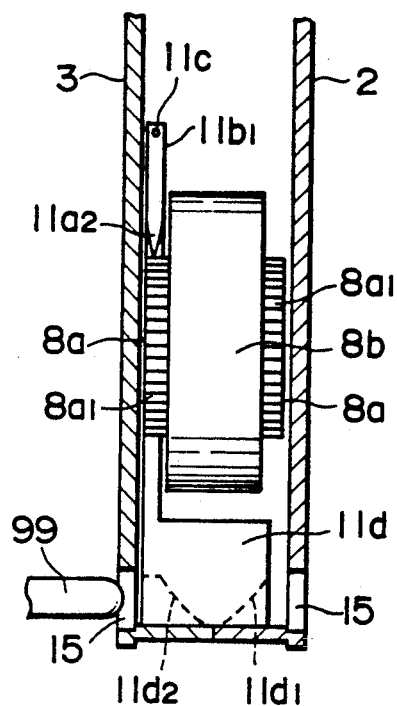
FIGS. 9a and 9b are fragmentary sectional views of the tape cassette of FIG. 4.
Figure 9B:
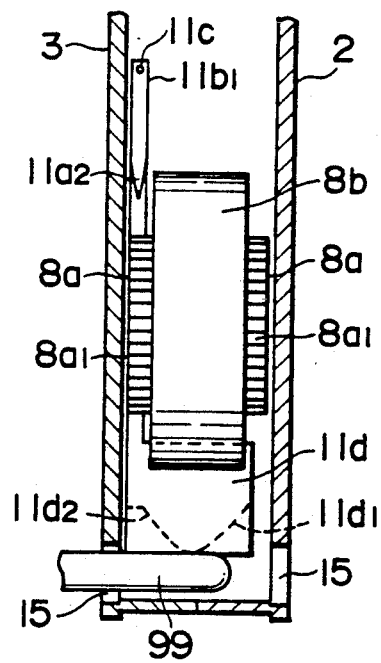
Figure 11:
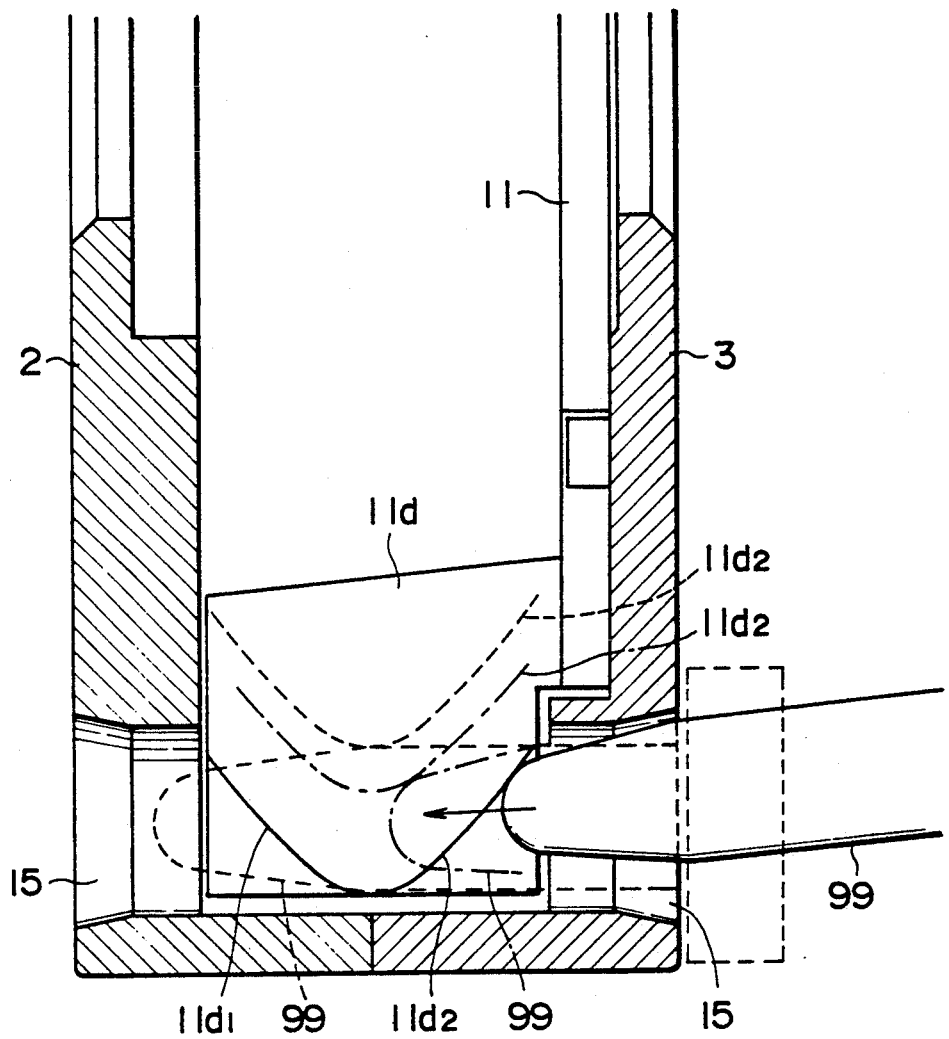
FIG. 11 is a fragmentary sectional view of assistance in explaining the positional relationship between the locking member of FIGS. 8a to 8e, and an unlocking pin.
Figure 12:
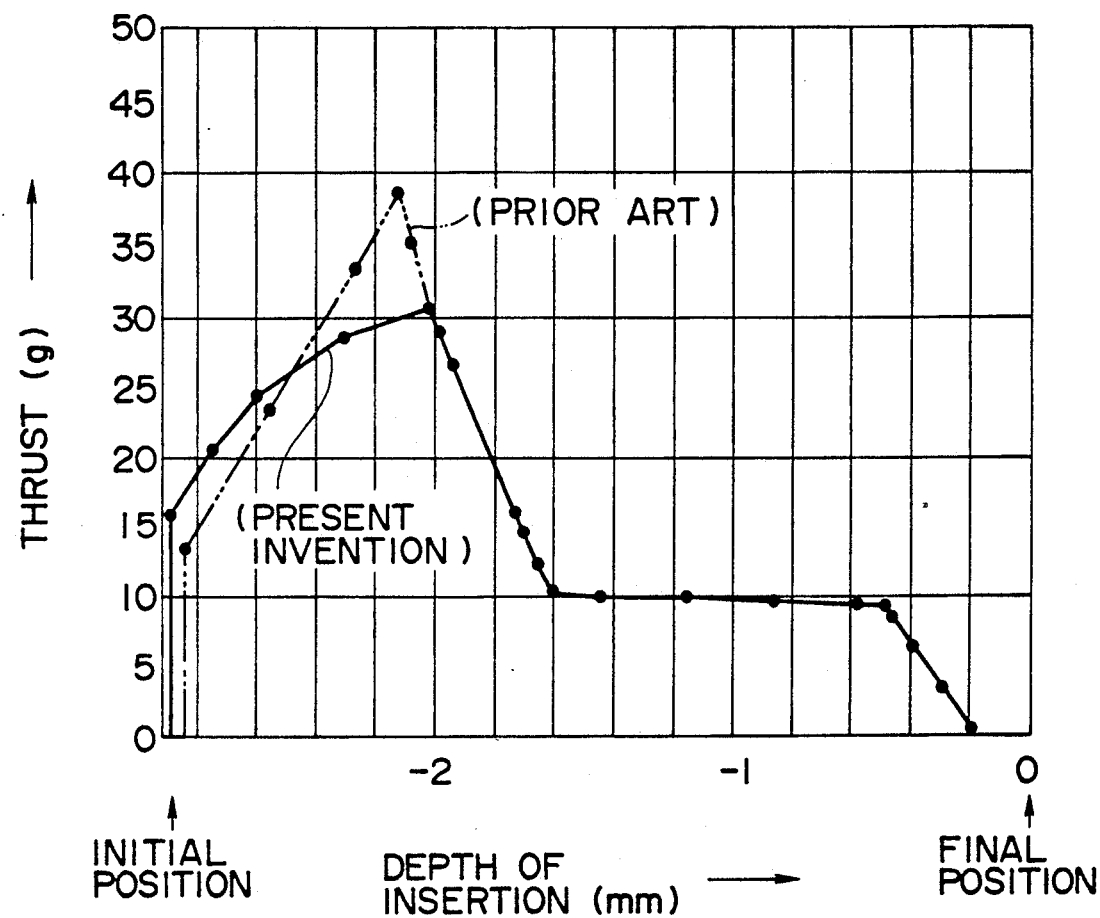
FIG. 12 is a graph of assistance in explaining the unlocking function of the unlocking pin.

When shifting the locking member 11 from the locking position shown in FIG. 9a to the unlocking position shown in FIG. 9b, the positioning pin 99 engages the convex, curved working surface $11d_2$ ($11d_1$) of the locking member 11. As the positioning pin 99 is inserted gradually in the tape cassette 1 the tail portion $11d$ is displaced as indicated by continuous lines, alternate long and short dash lines and broken lines in FIG. 11. FIG. 12 shows the variation of the unlocking force, namely, the thrust acting on the positioning pin with the depth of insertion of the positioning pin 99 in the tape cassette 1. In FIG. 12, continuous lines indicate the unlocking force for the tape cassette 1 of the present invention, and alternate long and two short dashes lines indicate the unlocking force for the prior art tape cassette provided with the locking member provided with flat slopes. In calculating the unlocking force, it was assumed that the initial strain of the locking spring $11c$ is 0.4 mm, the diameter of the locking spring $11c$ is 0.16 mm, and friction between the relevant parts is negligible.

As is obvious from FIG. 12, the convex, curved working surface $11d_2$ ($11d_1$) reduces effectively the maximum load (the load on the positioning pin 99 when the positioning pin is at a distance of about 2 mm from the final position) exerted on the positioning pin 99 by the locking spring $11c$. Accordingly, the abrasion of the convex, curved working surfaces $11d_1$ and $11d_2$ by the positioning pin 99 is reduced and the positioning pin 99 is able to be inserted smoothly in the tape cassette 1. The curvatures of portions of the convex, curved working surfaces are determined properly taking into consideration the design conditions for the relevant parts including the locking spring and the positioning pin so that the load on the positioning pin 99 is reduced to the least possible extent.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A tape cassette comprising:
a case body consisting of an upper half case and a mating lower half case; a pair of hubs contained within said case body and holding a tape-like recording medium between said hubs; and a locking member contained in a recess formed in an inner surface of said lower half case so as to be brought by sliding movement in a locking direction into engagement with respective circumferences of said hubs to lock said hubs and to be disengaged from said respective circumferences of said hubs to unlock said hubs;
wherein a plurality of ribs are formed on a surface of said recess formed in said inner surface of said lower half case, said locking member being supported for sliding movement on said plurality of ribs, and said plurality of ribs include ribs inclined at an angle to converge toward each other in said locking direction.

2. A tape cassette according to claim 1, wherein said plurality of ribs further include ribs extending in parallel to said direction of sliding movement of said locking member.

3. A tape cassette according to claim 1, wherein said plurality of ribs include at least a pair of ribs.

4. A tape cassette according to claim 1, wherein said locking member has a tail portion disposed at an end thereof consisting of a pair of convex, curved working surfaces of varying curvature said surfaces being arranged at an angle to each other and converging in the same direction as said locking direction of said locking member, an unlocking pin of a recording/reproducing apparatus engaging one of said convex, curved working surfaces of said tail portion to shift said locking member to unlock said hubs when said tape cassette is inserted in said recording/reproducing apparatus.

* * * * *